Sept. 22, 1964 G. HENRY 3,149,952
APPARATUS FOR ADJUSTING THE OPERATING CONDITIONS OF TANK FURNACES
Filed June 20, 1960 3 Sheets-Sheet 1
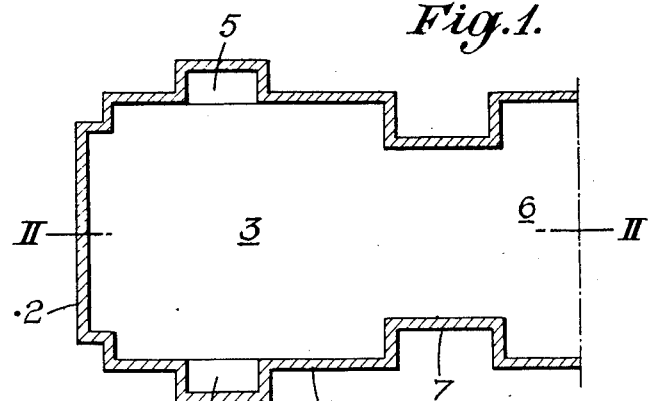
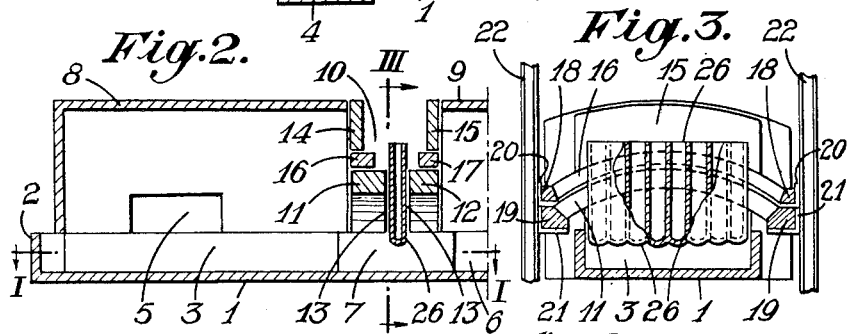
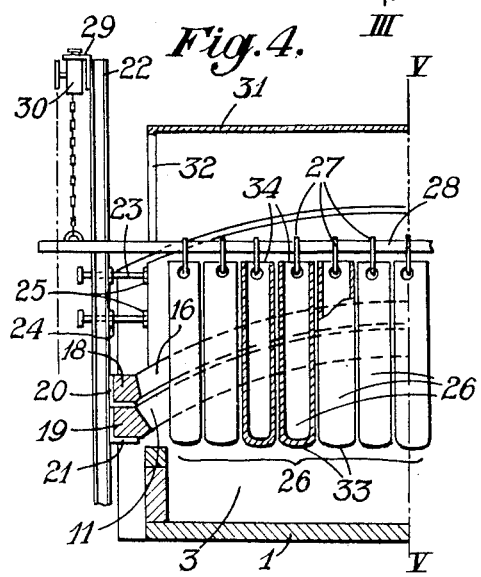
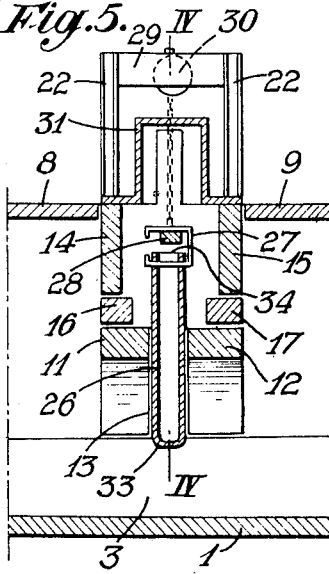
INVENTOR
GEORGES. HENRY
BY. Corey, Hart & Stemple
ATTORNEYS Sept. 22, 1964 G. HENRY 3,149,952
APPARATUS FOR ADJUSTING THE OPERATING CONDITIONS OF TANK FURNACES
Filed June 20, 1960 3 Sheets-Sheet 2
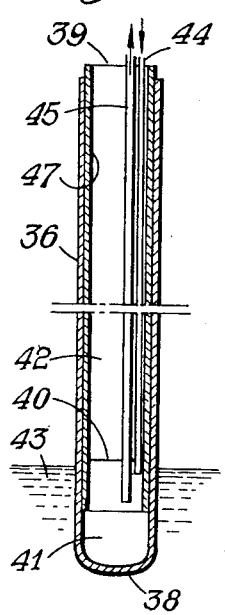
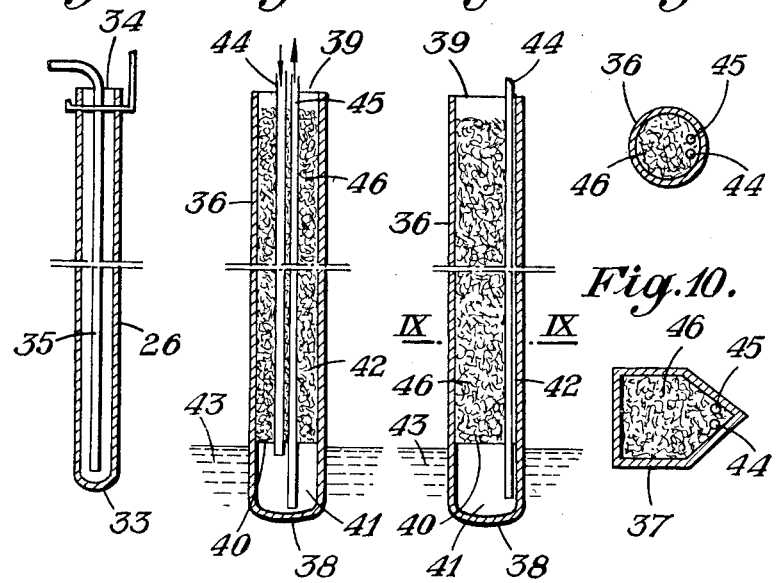
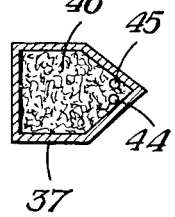
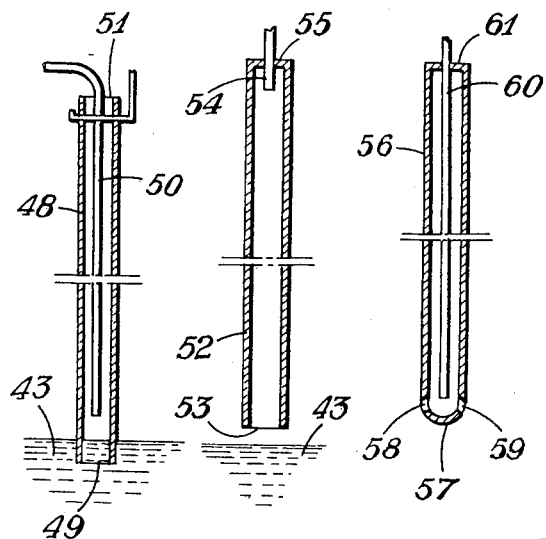
INVENTOR
GEORGES HENRY
By Corey, Hart & Semple
ATTORNEYS

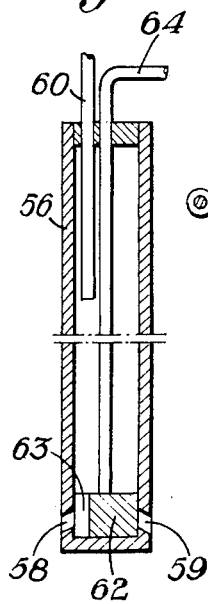
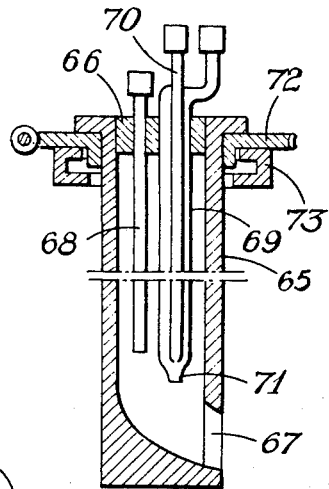
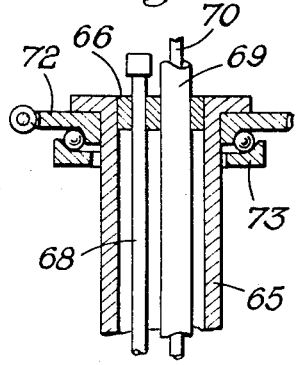
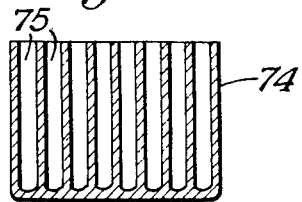
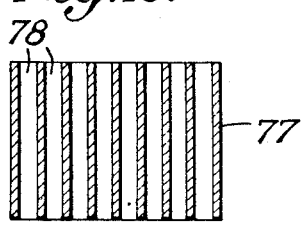
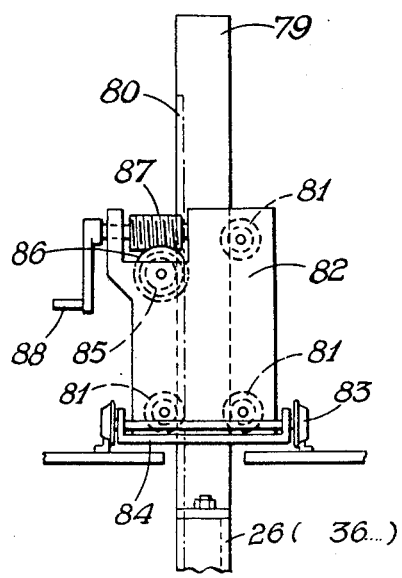

United States Patent Office 3,149,952
Patented Sept. 22, 1964

3,149,952
APPARATUS FOR ADJUSTING THE OPERATING CONDITIONS OF TANK FURNACES
Georges Henry, 2 Rue des Verreries, Jumet, Belgium
Filed June 20, 1960, Ser. No. 37,335
Claims priority, application Belgium, June 26, 1959, 459,736
5 Claims. (Cl. 65—347)

The present invention relates to an apparatus for regulating the operating conditions of tank glass furnaces.

In the known practice, starting materials introduced at one end of the furnace travel through a zone heated by a number of burners to bring them to a temperature sufficient for the melting and refining thereof.

The molten glass thereafter progresses to the other end of the furnace, constituting the working zone of the latter, in which the glass must be brought to the working temperature, which is lower than the melting temperature.

The glass must therefore cool down from the point at which it leaves the melting zone, and it is desirable to shield it from any heating effect emanating from this zone, failing which the heat escaping from the melting zone towards the working zone is lost.

It is known to avoid the heat losses in question and to render the temperatures adjustable in the aforesaid two zones of a tank glass furnace by providing between the melting and refining zone on the one hand and the working zone on the other hand a slot in the roof of the furnace, the latter being, if desired, narrowed at the point in question, and by disposing in this slot a screen or curtain of refractory material, formed either of a single piece which may be adjustable in height, or of a number of distinct elements which are movable separately and/or in combination in the vertical direction, for example a series of refractory tiles which are substantially contiguous and are suspended in such manner that their lower end is at a short distance from the level of the glass bath or penetrates into the latter in such manner as to slow down or to be able to slow down the movement of the said bath.

The essential object of the present invention is to create a screen consisting of one or more elements adapted to ensure in a simple and effective manner:

By means of their portion penetrating into the glass bath and constituting a barrier, and advantageously adjustable cooling of the glass to the working temperature when it is leaving the melting and refining zone, By their portion rising above the glass bath and constituting an insulating wall, an increase of the insulation capacity of the latter, and By the said advantageously adjustable cooling and by the said increased insulation capacity, a protection of the element or elements constituting the screen from corrosion by the glass, notably at the level of the bath.

In accordance with the invention, these objects are best achieved by forming the screen of one or more hollow elements consisting, for example, of refractory tubes of any appropriate cross-section, of which the portion immersed in the glass bath acts as a cooler, while the portion situated outside the bath acts as a heat-insulating wall.

In accordance with the invention, it has been observed that the transmission of heat by hollow elements considerably improves the protection of the working zone, owing to a substantial lowering of the temperature of the downstream face of the screen, and consequently a reduction of its radiation.

However, the invention is not limited to the main embodiment hereinbefore indicated, but lends itself to many modified embodiments, so that in broad terms its object can be summarized as a screen of the type under consideration characterised in that it consists of one or more refractory elements, of which at least one is at least partially hollow and may comprise a duct system for at least one liquid and/or gaseous fluid, which may be combustible, and which is capable of performing the function of a cooling and/or heating or heat-insulating agent.

Among the industrial advantages afforded by screens constructed in accordance with the invention for tank glass furnaces, there may further be mentioned, on the one hand, a considerable lightening of the said screens and consequently greater facility in handling and adjustment thereof, and on the other hand the possibility of readily adjusting not only their temperature and the temperature of the surface of the bath at the point under consideration, but also the intensity and direction of the glass currents on the surface of the bath, and even the conditions of the atmosphere obtaining in the working zone, for example in the working chamber and the drawing chamber.

The invention is hereinafter described in greater detail with reference to the accompanying drawings, in which:

FIGURES 1 to 3 illustrate diagrammatically, respectively: a horizontal section along the line I—I of FIGURE 2, a vertical section along the line II—II of FIGURE 1, and a transverse section along the line III—III of FIGURE 2, while FIGURES 4 and 5 illustrate to a larger scale and in greater detail, respectively: a transverse section along the line IV—IV of FIGURE 5, and a longitudinal section along the line V—V of FIGURE 4, of a first constructional example of a tank glass furnace provided with a hollow screen according to the present invention.

FIGURES 6 to 11 illustrate diagrammatically, respectively: longitudinal sections (FIGURES 6, 7, 8 and 11), and transverse sections (FIGURES 9 and 10), through various preferred constructional forms of a component element of a hollow screen according to the invention, the said element being formed of a tube closed at its lower end.

FIGURES 12 and 13 illustrate diagrammatically longitudinal sections through two constructional forms of a component element of the hollow screen according to the invention, the said element being formed of a tube open at its lower end.

FIGURE 14 illustrates diagrammatically a longitudinal section through a mixed constructional form of a component element of the hollow screen according to the invention, the said element being formed of a tube closed at its lower and upper ends while having formed in its lower closed end relatively narrow and appropriately oriented ejection apertures.

FIGURE 15 illustrates in greater detail a longitudinal section through a component element of the hollow screen of the type illustrated in FIGURE 14, having adjustable and closable ejection apertures.

FIGURES 16 and 17 illustrate two modified constructional forms of a rotative tubular component element of the screen according to the invention.

FIGURES 18 and 19 illustrate diagrammatically two other modified constructional forms of the hollow screen according to the invention, in which the latter consists of at least one hollow plate having vertical channels closed and open respectively at their lower ends.

FIGURE 20 illustrates a modified constructional form of the device for the suspension of the hollow screen according to the invention.

According to FIGURES 1 to 3, the tank 1 of the furnace containing the molten glass comprises at its end a doghouse 2 through which the starting materials are introduced. The latter progress towards the melting zone 3 situated between the burners 4, 5 and are thereafter directed towards the working zone 6, whereby they become progressively refined and cooled, so as to reach the temperature necessary in the process of production.

There is provided between the zones 3 and 6 of the tank of the furnace (FIGURES 1 and 2) in a manner known per se a zone 7 preferably of slightly smaller width than the zones 3 and 6. A gap 10 is left above the zone 7 between the roofs 8 and 9 of the zones 3 and 6, and there is so disposed in the said gap as to be vertically adjustable a screening curtain consisting, in accordance with the invention, of one or more hollow elements as hereinafter described, as also the devices for maintaining the said screening curtain in position, for example a segmental arch, vertically and transversely divided into two parts by a slot designed to receive the said screen.

In accordance with FIGURES 2, 3, 4 and 5, the said segmental arch may consist of two rows of blocks 11 and 12 separated by the gap 13 designed to receive the screen, the said rows of blocks 11, 12 being joined to the roofs 8, 9 by spandrel walls 14, 15 each resting on corresponding parts 11, 12 of the segmental arch. The latter may be reinforced by discharge arches 16, 17.

The arches 11, 12, 16 and 17 are buttressed by bearing members 18, 19 (FIGURES 3 and 4) supported on brackets such as 20, 21 fast with metal columns 22 of the tank.

In the transverse direction of the furnace, the spandrel walls 14, 15 which rest on the discharge arches 16, 17 are supported, for example, by screwthreaded push rods 23 mounted in nuts 24 fixed to the columns 22, which push rods bear against the walls 14, 15 through metal bearing plates 25. The push rods 23 thus permit of adjusting the pressure to be exerted on the walls 14, 15 as a function of the temperature variations, so as to hold them in position without any excessive play and without any excessive pressure.

In the embodiment of the invention as illustrated in FIGURES 2 to 5, the screen consists of a curtain of hollow refractory elements 26 of tubular form, which are closed at their lower end and open at their upper end, and which have any appropriate cross-section, for example circular, rectangular or curved form, for example circular, the said tubular elements being suspended side-by-side by means of straps 27, desirably in such manner as to be laterally displaceable, from a beam 28 suspended at each of its ends from a beam 29 by way of a pulley block 30, each of the beams 29 being fixed at its two ends to the respective columns 22 or to a member fast with the latter.

The pulley blocks 30 may be movable on a monorail.

The position of the hollow curtain 26 in the aperture 13 can thus be readily adjusted by means of the straps 27 and the pulley blocks 30, both in the vertical direction and in the horizontal direction, in order to obtain exactly the effect of insulation which is desired and to modify this effect, as also readily to replace the entire curtain or some of its component elements 26. Moreover, the curtain according to the invention is entirely independent of the masonry of the furnace and does not exert any force thereon.

If necessary, the gap 10, including the slot 13 between the roofs 8 and 9 of the compartments created above the zones 3 and 6 of the tank, may be covered by a casing 31 affording passage at 32 to the screen operating members, so as to insulate the interior of the furnace from the outside in a particularly effective manner.

In the constructional example illustrated in FIGURES 2 to 5, the tubular component elements 26 of the screen, which are closed at their lower end 33 and open at their upper end 34, are used simply as such, that is to say, without any special means for the forced circulation of a temperature regulating fluid. Even in this simple constructional form, the tubes 26 ensure not only a considerably improved thermal insulation of the working chamber in relation to the hearth of the furnace, but also permit of effectively adjusting the temperature of the bath by immersion to a variable depth of their end closed towards the bottom and open towards the top, in the glass bath coming into contact with the said ends, of the hearth of the furnace in the working chamber.

Now, the use of hollow screen elements, for example in the form of tubes also makes it possible to effect a cooling of the screen and/or an adjustment of its temperature and/or of the temperature of the bath entering the working chamber by means of a forced circulation of air or of another gaseous or liquid fluid, for example water.

FIGURE 6 illustrates an example of a construction of this nature, wherein a tube 35 for the supply of fresh or appropriately preheated air descends to a variable depth in the tubular element 26 closed at its lower end 33, the said air being obliged to rise in the tube 26 and escaping therefrom through its open upper end 34.

The tube 35 could also take in the air from the bottom 33 of the tube 26, the air thus withdrawn being replaced by air entering the tube 26 by way of its open end or through a special duct provided for the purpose.

A particularly advantageous embodiment of the invention is illustrated in FIGURES 7 to 11.

In accordance with these figures, the main component element of the screen is also formed of a tube 36, for example of circular cross-section (FIGURES 7, 8, 9 and 11), or of a tube 37 of polygonal cross-section (FIGURE 10), which is closed at its lower end 38 and open (or closed) at its upper end 39. In accordance with FIGURES 7, 8 and 9, the interior of the tube 36 is divided by a hermetic transverse partition 40 into two superposed compartments 41, 42. The partition 40 is disposed at such a height that when the tube 36 is in position, with its lower closed end 38 immersed in the glass bath 43, the said partition 40 is slightly above the level of the bath.

Two pipes 44 and 45 disposed in the tube 36 along the axis of the latter open into the compartment 41 through the partition 40. The compartment 42 is advantageously filled with heat-insulating material 46 surrounding the pipes 44 and 45.

A cooling liquid blown into the pipe 44 cools the wall of the compartment 41 and escapes through the pipe 54.

The cooling of the glass 43 against and below the wall of the compartment 41 also increases the barrier effect, and this effect is adjustable by adjustment of the circulation of the fluid in the system 41, 44, 45.

On the other hand, the heat-insulated compartment 42 constitutes an insulating wall between the atmosphere of the melting furnace and that of the working zone, thereby preventing transmission of heat from the melting towards the working zone.

Generally speaking, the component elements of the hollow screen according to the invention may consist of refractory material or of metal. According to the invention, they are protected from the corrosive action of the glass by virtue of the fact that the submerged portion of the said elements is maintained at a temperature equal to or lower than the limit devitrification temperature. The bed of devitrified glass which will be formed against the submerged wall of the element will insulate it from the molten glass.

The elements 36 or 37 may be given such a cross-section, and/or the inner pipes 44, 45 may be so arranged, as to increase the insulating effect of the screen with respect to the atmosphere of the melting zone, while increasing the cooling towards the working zone by radiation from the screen towards the working zone.

FIGURES 8 to 11 illustrate practical examples of this modified embodiment of the invention.

According to FIGURES 8 and 9, the elements have, as in the case of FIGURE 7, a cylindrical tubular form 36 and are closed at their lower ends 38, while being divided into two compartments 41 and 42 by the partition 40.

The pipes 44 and 45 are disposed against the wall 36 on the side of the working zone, the tube being filled above the partition 40 with insulating material 46.

In accordance with FIGURE 10, the tubular elements 37 may be given a mixed polygonal cross-section, for example the form of a triangle joined to a square or to a rectangle, or any other appropriate form for applying the aforesaid principle.

The pipes 44, 45 are disposed in the angle formed by the apex of the triangle. The tube is filled with heat-insulating material 46, as in the preceding examples.

The square portion of the element 37 faces towards the melting zone, while the apex of the triangle is directed towards the working zone.

Finally, since the depth of immersion of the elements may vary, it is desirable to be able to adjust the height of the compartment 41 cooled by the cooling fluid.

According to FIGURE 11, the element is formed of two telescopic tubes 36 and 47.

The outer tube 36 is closed at its lower end 38.

The inner tube 47 is closed at its lower end, for example by a partition 40 adapted to slide on the tubes 44, 45 for supplying the cooling fluid to the compartment 41 and discharging it therefrom respectively.

It is thus possible to vary at will the height of the compartment 41 by sliding the tube 47 in the tube 36.

It will be understood that the screen according to the invention may be formed of a combination of the various constructional forms hereinbefore described with one another and with other constructional forms in the most varied ways without departing from the scope of the invention.

In the constructional forms illustrated in FIGURES 12 and 13, the component elements of the screen are formed of tubes open at their lower end, so that, if these tubes are combined with a system for the forced circulation of air, for example, the current of air introduced into the tubes comes into direct contact with the glass bath, and exerts thereon a cooling action which can be utilised for the control of the currents of glass.

FIGURE 12 illustrates a first embodiment of this nature, wherein a tube 50 for the supply of fresh or appropriately preheated air descends in the tubular element 48, which is open at its lower end 49, into the glass bath 43, for example to a variable depth, the said air escaping through the open end 51 of the tube 48 after having cooled the glass at 49 and the tube 48 itself.

According to FIGURE 13, the open lower end 53 of the screen tube 52 is situated above the level of the glass bath 43, while the tube 54 supplying the cooling fluid preferably opens into the closed upper portion 55 of the screen tube 52, so as first to cool the latter over its entire height and then the glass.

FIGURE 14 illustrates an embodiment in which the element constituting the screen is a tube 56 closed at its lower end, while having above its base 57 one or more apertures 58 opening, for example, towards the melting zone 3 of the furnace and if desired inclined towards the surface of the bath, as also, if desired, one or more apertures 59 opening towards the working chamber 6 and if desired inclined towards the surface of the bath, so that it is possible to set up surface currents in the desired direction or directions on the surface of the bath by means of a gas fed into the tube 56 through a tube 60 extending through the closed upper end 61 of the tube 56, the gas blown in for this purpose being of any appropriate nature.

It would also be possible to dispose between the tube 60 and the apertures 58, 59 a device adapted to be actuated from the outside, by means of which the fluid introduced through the tube 60 can be directed towards the aperture 58 or towards the aperture 59, or towards both apertures, or the admission of fluid towards both apertures can be interrupted.

FIGURE 15 illustrates diagrammatically a distributing device of this nature, which consists of a rotary shut-off member 62 having a number of passages 63 which can be manipulated from the outside by means of the rod 64. In the illustrated position, the gaseous fluid admitted through 60 into the tube 56 leaves the latter by way of the aperture 58, while the aperture 59 is closed by the shut-off member 62.

Another embodiment of the invention is illustrated in FIGURES 16 and 17, which the screen is composed of tubular refractory elements 65 closed at their upper ends 66 and having in their lower ends only a single lateral aperture 67 of appropriate cross-sectional form. In the upper portion 66 of the tube 65 there are so mounted as to be axially adjustable a tube 68 for the injection of air or another coolant and two, for example, concentric, tubes 69, 70 leading to a burner jet 71, the tube 69 being adapted to serve for the supply of a combustion-assisting gas, for example air, and the tube 70 for the supply of a combustible fluid, for example of gaseous form. The assembly 65 to 71 may in addition be arranged to be rotatable or angularly adjustable about its longitudinal axis on an annular support 72, 73 of which the part 73 consisting of, for example, a ball bearing (FIGURE 17) is suspended, for example in the manner hereinafter described.

The hollow screen according to the invention may also consist of at least one hollow plate having, for example, the form of a shallow tank and comprising one or more compartments which are closed or open at the lower and/or upper ends, and/or at least one central portion of the plate.

Thus, in accordance with FIGURE 18, the hollow screen consists of a plate 74 formed with vertical tubular recesses 75 situated side-by-side and closed at their lower end 76, while according to FIGURE 19 the screen consists of a plate 77 formed with vertical tubular recesses 78 disposed side-by-side and open at both ends.

One or more or all of the channels 75 and 78 may be provided with a system for the admission, discharge, injection, and/or guiding of one or more cooling or heating fluids and/or heat-insulating material as hereinbefore described with reference to FIGURES 6 to 17.

The length or height of the hollow elements constituting the screen according to the invention, as described with reference to FIGURES 2 to 19, as also their points of suspension may be so chosen that their lower ends are horizontally or non-horizontally aligned. Thus, the height of the free passage left for the glass bath itself and/or for the gases above the bath may be fixed at will by an adjustment effected by means of the pulley blocks 30.

In addition, the hollow component elements of the screen may be suspended by means of devices adjustable by means of elements or groups of elements in such manner that the position of these elements or groups of elements may be separately fixed in relation to the level of the glass bath, and transversely in relation to one another and in relation to the furnace, for example as illustrated in FIGURE 20, in the following manner: each element 26 or 36 or 37 or 48 or 52 or 56 or 65 or 74 or 77 of the screen is fixed to at least one bar or toothed rack 79, 80 guided between rollers 81 mounted in a casing 82 supported by bearings 83 in such manner as to be displaceable transversely in relation to the furnace on a platform 84 mounted at a suitable level on the columns 22. In addition, there is mounted in the casing 82 a pinion 85 meshing with the toothed rack 79–80 and fast with a worm wheel 86 co-operating with a worm 87 adapted to be controlled, for example, by a crank 88.

It is obvious that it is also possible with the aid of the described suspension to lower the hollow curtain according to the invention wholly or partly in such manner that its lower edge penetrates to a desired depth into the glass bath 43 or descends to a desired depth above the level of the said bath.

In the first case, the barrier effect hereinbefore described is obtained, that is to say, a more or less pronounced slowing down of the current of glass is obtained, together with an appropriate adjustment of its temperature.

In this case, it is possible to cause the hollow elements of the curtain to penetrate to different depths of the bath from one point to another in the direction of the width of the tank 1, for example to a greater depth along the edges of the tank than at its centre, or vice versa, so as to obtain a differential adjustment of the current of glass over the width of the tank.

In the constructional form illustrated in FIGURES 16 and 17, the supporting element 73 may be suspended from the toothed rack 79, 80, so that the apertures 67 of the tubular elements 65 of the screen may be not only adjusted in height but also oriented in an adjustable fashion, either towards the melting zone 3 or towards the working zone 6 of the tank of the furnace, so that it is possible thus to influence at will both the temperature and the direction of the surface currents of the glass bath and the atmosphere of the furnace on one or both sides of the screen 65.

The invention also concerns the tank glass furnaces provided with a guiding and adjusting apparatus substantially as hereinbefore described and as illustrated by way of example in the accompanying drawings.

Modifications may obviously be made to the manner in which the present invention is put into practice without departing from the scope thereof.

I claim:

1. Apparatus for controlling the operating conditions of a tank furnace having a melting and refining zone at one place and a working zone at another place, the two zones being enclosed and connected by an intermediate roofed zone, said apparatus comprising a screen suspended in said intermediate zone so that it is disposed across the width of said intermediate zone with one side thereof facing upstream toward said melting and refining zone and the other side thereof facing downstream toward said working zone, and thereby forms a barrier against passage of heat from said melting and refining zone and through said intermediate zone to said working zone, said screen extending substantially across the entire width of the furnace in said intermediate zone and from a point substantially below the level of the molten mass in such intermediate zone upwardly to the roof of such zone so that substantially the entire transverse area of said intermediate zone above said submerged point is blocked by said screen, said screen having substantial thickness throughout said transverse area of said intermediate zone, and having formed therein between the upstream and downstream sides thereof a plurality of vertically disposed openings extending substantially throughout the height of such zone area, such openings from approximately the level of the molten mass downwardly in said screen being compartmented and of such size as to enable the bottom portion of said screen submerged in said molten mass to function as a cooling means below the level of said molten mass, and heat exchange fluid flow pipes extending downwardly through said screen and being in communication with the compartmented openings thereof within the molten mass.

2. Apparatus such as defined in claim 1, in which the openings in said screen above the level of the molten mass are substantially filled with insulating material.

3. Apparatus such as defined in claim 1, including partitioning means in said opening located at approximately the level of said molten mass and forming said compartmented openings within the molten mass.

4. Apparatus such as defined in claim 1, including means in at least one of said compartmented openings within the molten mass providing it with different heat characteristics than another of such compartmented openings within the molten mass.

5. Apparatus such as defined in claim 3, including means movably supporting said partitioning means in at least one of said openings and operable to shift said partitioning means vertically within said one opening.

References Cited in the file of this patent

UNITED STATES PATENTS

| | | |
|---|---|---|
| 1,119,329 | Wadsworth | Dec. 1, 1914 |
| 1,542,842 | Schenck | June 23, 1925 |
| 1,547,910 | Ferngren | July 28, 1925 |
| 1,595,861 | Diederichs | Aug. 10, 1926 |
| 1,928,026 | Nameche | Sept. 26, 1933 |